United States Patent [19]
Flood et al.

[11] Patent Number: 5,966,300
[45] Date of Patent: Oct. 12, 1999

[54] REDUNDANT AUTOMATION CONTROLLER WITH DEDUCTIVE POWER-UP

[75] Inventors: Mark A. Flood, Mayfield Heights; William B. Cook, Northfield; Mark E. Taylor, Chesterland; Steven P. Richter, South Euclid, all of Ohio

[73] Assignee: Allen-Bradley Company, Inc., Milwaukee, Wis.

[21] Appl. No.: 08/878,291

[22] Filed: Jun. 18, 1997

[51] Int. Cl.[6] .................................................. G05B 15/00
[52] U.S. Cl. .......................... 364/131; 364/133; 364/187
[58] Field of Search .................................. 364/184, 185, 364/186, 187, 130, 131, 132, 133, 134, 135–138, 140

[56] References Cited

U.S. PATENT DOCUMENTS

| | | | |
|---|---|---|---|
| 5,136,798 | 8/1992 | McLaughlin et al. | 364/184 |
| 5,313,385 | 5/1994 | Whang | 364/187 |
| 5,313,386 | 5/1994 | Cook et al. | 364/187 |

*Primary Examiner*—Reba I. Elmore
*Assistant Examiner*—Thomas E. Brown
*Attorney, Agent, or Firm*—Keith M. Baxter; John M. Miller; John J. Horn

[57] ABSTRACT

A redundant industrial controller system has a primary controller backed up by a secondary controller and recovers from a power loss by analyzing the state memories of the controllers to reach a determination of which controller would best be suited to assume primary control status without resorting to arbitrary tie-breaking procedures or race conditions. The rules and their inputs are applied by both controllers which independently make the determination as to which controller should be the primary controller.

10 Claims, 3 Drawing Sheets

REDUNDANT AUTOMATION CONTROLLER WITH DEDUCTIVE POWER-UP

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial controllers and in particular to an industrial controller system having two industrial controllers operating as active and back-up controllers.

Industrial controllers are special purpose computers used for controlling factory automation and the like. Under the direction of a stored program, a processor of the industrial controller examines a series of inputs reflecting the status of a controlled process and changes outputs effecting control of the controlled process.

Typically, an industrial controller is constructed in a modular fashion, having one or more functional modules connected together through a common backplane in a rack or the like. The modular construction allows the circuitry of the industrial controller to be customized to some degree for each application and simplifies maintenance and repair of the industrial controller in the event that one or more modules fail.

Industrial controllers must often provide uninterrupted and reliable operation for long periods of time. One method of ensuring such operation is by providing a second industrial controller operating in a back-up mode to an active industrial controller. If the active industrial controller should fail, the back-up controller may take over the controlled process or equipment with minimal interruption. The back-up controller may also be used to facilitate maintenance or testing of the control program. Such modifications may be performed on one controller (either the active or back-up controller) reverting to the other controller if problems develop. In such circumstances, it is desirable that the two controllers be completely symmetric with either one having the capability of assuming an active or back-up capacity.

A loss of power can disable both the active and back-up controller or power may be lost to either controller individually. In both circumstances, it is desirable that when power is restored the control process resume smoothly with a single controller acting as the active controller and a single controller acting as the redundant controller.

One method of resolving controller status in the event of a power loss is taught in U.S. Pat. No. 5,313,386 issued May 17, 1994, and assigned to the assignee of the present invention. Using this method, each controller after completing an initialization, checks to see if the other controller has taken the first steps toward assuming the role of active controller. If so, the other controller adopts a back-up role; if not, the other controller proceeds to assume the active controller role.

In the case where both controllers simultaneously attempt to take the active role, for example, when power is applied to both controllers at exactly the same time, a tie-breaking procedure is invoked in which a single designated controller previously having a jumper set assumes the active role.

This approach has the advantage of avoiding needless disruption of the controlled process if active control is already being performed by one controller regardless of whether it was the controller having the active role prior to power loss. It is particularly well suited to the case where only one controller has experienced a power loss. When that controller returns to power, it is prevented from disrupting the ongoing control of the controller that did not experience power loss.

On the other hand when both controllers lose power, this approach creates a race condition in which active control is awarded to the controller which has taken the first steps to assume active control, even if active control has not yet been established. In a tie situation, the active control is awarded arbitrarily to one controller. In both cases, control may revert to less than the ideal controller.

This problem can be minimized by ensuring that both controllers are equally qualified to assume active control of the process, but to insist on such qualification at all times limits the usefulness of a back-up controller, for example, to be used in testing upgrades.

BRIEF SUMMARY OF THE INVENTION

The present invention selects one controller to be the active controller, after power-up, by deducing which controller is best qualified to be the active controller from the evidence contained in various state memories of the controllers. This deductive approach better ensures that the controller selected for active control is the most suitable controller for that purpose.

Specifically, the present invention provides an industrial control system having a first and second controller unit. The two controller units are operable in a primary/secondary control relationship with a primary controller providing active control of an industrial process and a secondary controller unit providing back-up for the primary controller unit.

Each controller unit includes a communication link with the other controller unit and a state memory having data indicating operation of the controller unit including whether the controller unit is currently operating as a primary or secondary controller unit. A processor within the controller units executes a stored program to detect a power-up of a controller unit and to query a state memory of the other controller unit and a state memory of the controller unit.

When the state memory of the other controller unit indicates the other controller unit is present but operating neither as a primary controller unit or a secondary controller unit, the program prevents the controller unit from operating as a primary controller unit unless such operation is indicated by a predetermined set of rules uniquely indicating which of the controller units is likely to be most suitable to serve as the primary controller, and operating on data from the state memories available to both controller units.

Thus, it is one object of the invention to provide a mechanism that better selects which controller should become a primary controller after a power loss. The state memories preserved after the power loss are reviewed by the controllers to uniquely identify one controller to be the primary controller. Generally, the data includes indications as to what controller was the primary controller immediately before power-down, indications of the failure of modules in one or the other controller, indications of lack of programming in one of the controllers, and time of power-down.

It is another object of the invention to avoid needless change in primary control, yet at the same time to ensure that the rules are used to select the primary controller in most other circumstances. If one controller is already operating as a primary or secondary controller, the rules are not applied.

However, absent this situation, no controller may become a primary controller without that conclusion being indicated by an execution of the rules.

It is another object of the invention to provide symmetry in the process of selecting the primary controller permitting either controller to be the default primary controller. By using identical rules in each controller based on data available to both controllers, there is no intrinsic bias towards one controller as would be the case in a tie-breaking system that employed only jumpers.

The controller units may be composed of interconnected functional modules and the data operated on by the rules may be data indicating whether any of the functional modules were most recently part of a primary or secondary controller. The rule may be to enable a controller as a primary controller unit only when that controller unit has functional modules with values indicating their most recent operation was as part of a primary controller.

Similarly, the rule may enable a controller unit as the primary controller unit when only that controller unit does not have functional modules with values indicating their most recent operation as part of a secondary controller.

Thus it is another object of the invention to select as a primary controller that controller that was last operating as the primary controller.

The data may indicate whether a functional module has failed and the rule may be to enable an industrial controller as the primary controller unit when only that controller unit has functional modules without failure.

Thus it is another object of the invention to select as a primary controller that controller having operable hardware.

P The data may include data indicating whether the memory of a processor of the controller unit is blank. The rule may be to enable as the primary controller unit the controller unit which does not have blank memory.

Thus, it is another object of the invention to identify that controller unit most likely to have been programmed.

The data may include a time at which the power-down occurred and the rule may be to enable a controller unit as the primary controller unit when it has the later power-down time.

Thus, it is another object of the invention to select as the primary controller, the controller which was most likely to have been in control last.

The time values of power-down may be rounded to the nearest second.

Thus, it is another object of the invention to avoid simple race conditions in selecting the primary controller. By ensuring that there is at least a one second difference in power-down time, difference in power down time more likely indicates that one controller was powered down independently.

The data may indicate the number of modules in each controller unit and the rule may be to enable a controller as the primary controller unit only when the controller unit has more functional modules.

Thus, it is another object of the invention to select as the primary controller a controller that has not recently had a module removed.

The data may also include a unique serial number for each controller unit and the rule may be to select the primary controller unit mathematically based on the serial number if no other rule has provided a unique determination.

Thus, it is another object of the invention to avoid a bias toward one particular controller unit unless no unique determination may be reached by other rules examining the data.

The foregoing and other objects and advantages of the invention will appear from the following description. In this description, references are made to the accompanying drawings, which form a part hereof, and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

Controller Hardware

Figure 1:
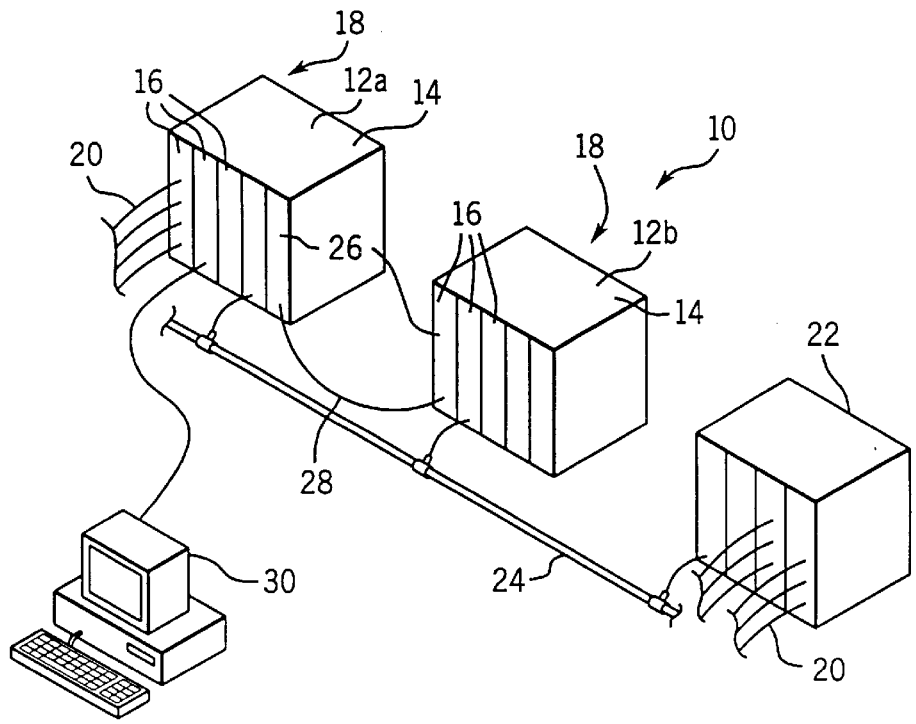
FIG. 1 is a simplified perspective view of an industrial controller having a primary and secondary controller, each composed of finctional modules connected by a backplane and contained in separate racks.

Referring now to FIG. 1, an industrial control system 10 of the present invention includes a primary controller 12a and a secondary controller 12b housed in separate racks 14. Each of the racks 14 include multiple functional modules 16 electrically communicating via a backplane 18 comprised of multiple conductors running along the back of the racks 14.

Included among the functional modules 16 may be a communication module permitting communication between the controller 12a and controller 12b, as well as the remote I/O rack 22 along common high-speed link 24. The controllers 12a and 12b may have the same address on the link 24 to facilitate changing control of the process between controllers 12a and 12b without reprogramming the addresses used by the remote I/O rack 22 or other devices communicating with the controllers. The remote I/O rack 22 includes multiple I/O modules communicating with the controlled process also through lines 20. The I/O modules, communication modules and I/O rack operate generally according to methods well understood in the art with exceptions to be described below.

Figure 2:
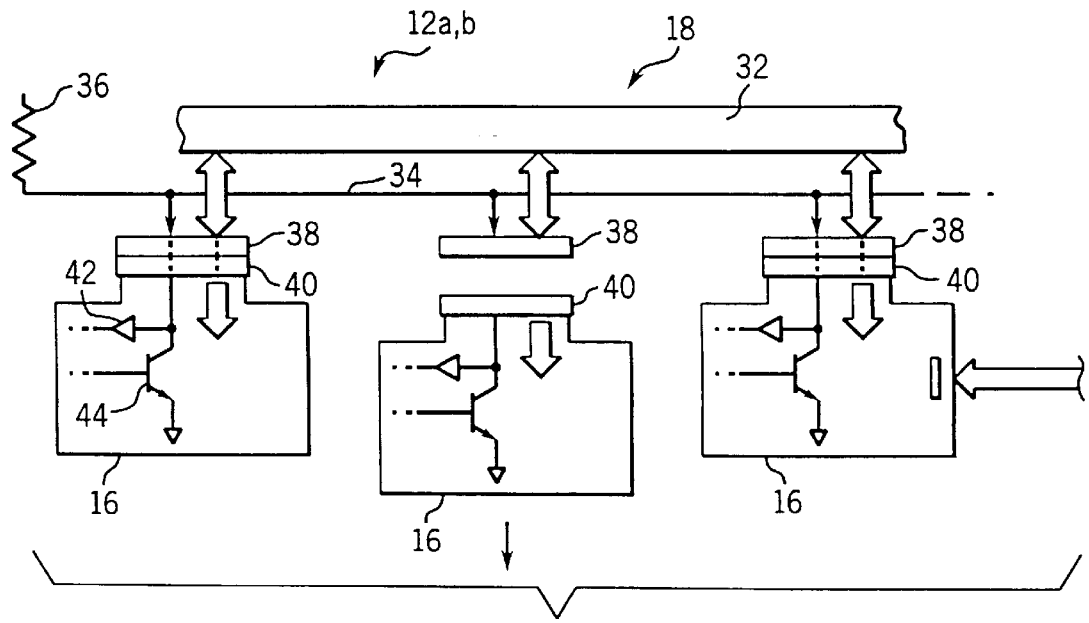
FIG. 2 is a block diagram of the functional modules of the primary controllers of FIG. 1 showing connection of the functional modules to the backplane including a fault status line and the removal of one functional module.

Controller 12a and controller 12b may also be connected via the same or a separate communication channel to a programming terminal 30 being of a conventional desktop computer design. Referring now to FIGS. 1 and 2, the backplane 18 includes a parallel bus 32 for high-speed connected messaging between the functional modules 16. The backplane 18 also includes a system failure line 34 which is pulled to a high state in the absence of failure by a pull-up resistor 36.

Spaced along the backplane 18 within the racks 14 are multi-pin connector halves 38 receiving corresponding connector halves 40 attached to the functional modules 16. When a functional module 16 is connected to the backplane 18, the multi-channel bus 32 and the system failure line 34 are electrically connected to the electronics on the functional modules 16 for the exchange of information.

On each functional module 16, the system failure line 34 is received by a card input 42 so that the functional modules 16 may monitor the status of the system failure line 34. On each functional module 16, the system failure line 34 is also connected into a pull-down transistor 44 for asserting the system failure line by pulling it to a low voltage.

As will be understood from this description, the system failure line 34 provides an effective logical OR of failure signals from the individual functional modules 16. Thus, the system failure line 34 signals a failure of at least one finctional module 16, but does not distinguish which modules 16 have failed, or how many modules 16 have failed.

Figure 3:
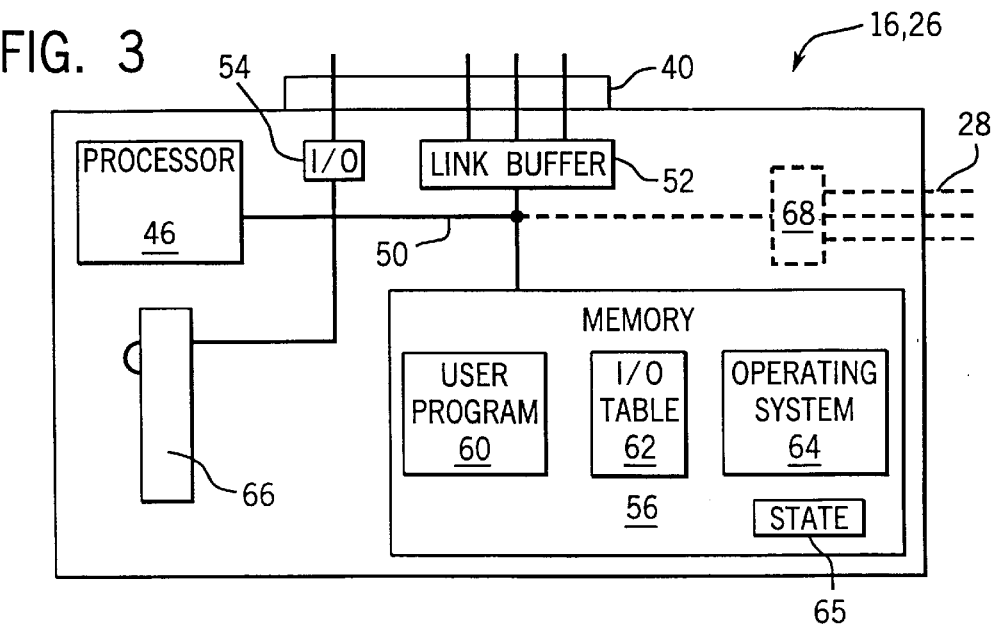
FIG. 3 is a block diagram of a functional module of FIG. 2 showing the allocation of memory to a control program, I/O data, state flags and an operating system.

Referring now to FIG. 3, a typical functional module 16 will include a processor 46 connected via an internal bus 50 to a link buffer 52 communicating with the connector 40 and ultimately with the backplane 18. The bus 50 may also communicate with the card input 42 and pull-down transistor 44 (described above and shown in FIG. 2) collected as I/O 54 in FIG. 3. Bus 50 may also connect to various front panel displays 66 including status lights and the like.

An electronic memory 56, including volatile and non-volatile memory components well understood in the art, is also connected to bus 50 to communicate with the processor 46. Memory 56 holds a user program 60 written to control the particular industrial application at hand. An I/O table 62, of a type understood in the art, is also contained in memory 56 and stores the input and output values exchanged with the controlled process over lines 20, either directly by the functional module 16 or via other functional modules as transferred through the link 24 or the backplane 18. Generally, as is understood in the art, the I/O table 62 is asynchronously updated by special purpose hardware, and the processor 46 accesses the I/O table 62 as updated in the manner of conventional memory.

An operating program 64 is also contained in memory 56 to provide a number of features related to the present invention as will be described.

Also included in memory 56 are state data 65 recording the state of the module 16 generally, and in the system back-up modules 26 indicating whether the particular controller 12a or 12b is a primary controller or secondary controller, and if a secondary controller, whether it is in a standby, disqualified or qualified mode, as will be described below. The flags also indicate whether auto-qualification shall be performed as will be described. The state data 65 in memory 56 may be set by user command or by execution of the operating program 64 as will be described.

Referring now to FIGS. 1 and 3, the controllers 12a and 12b also each include a system back-up module 26 coordinating back-up operation between the primary controller 12a and secondary controller 12b. The system back-up modules 26 communicate via a special-purpose, inter-chassis data link 28.

The system back-up module 26 is similar to the other functional modules 16, however, in the system back-up modules, the memory 56 does not store the user program 60 or the I/O table 62. In addition, the system back-up modules 26, storing a different operating program 64, operate to coordinate back-up activities as will be described.

Like other functional modules 16, the system back-up modules include the connector 40 to connect them to the bus 32 and to the system failure line 34. In addition, the system back-up modules 26 include a special buffer 68 communicating with the inter-chassis data link 28 described above. This link allows the system back-up modules 26 to coordinate activities between the primary and secondary controllers in providing back-up for one another without need for or interference with the link 24 (which is independently susceptible to failure).

Qualification

During normal operation of the controllers 12a and 12b, first controller 12a will act as a primary controller actively controlling an industrial process in the manner of a conventional industrial controller. In order that the second controller 12b be prepared to undertake control of that process if controller 12a is incapacitated, it is necessary that controller 12b have the same user program 60 and I/O table 62 as that present in primary controller 12a.

This coordination of the controllers 12a and 12b is provided by a process termed "qualification" in which there is a cross-loading of the memories 56 of the first controller 12a and the second controller 12b. Qualification is followed by a constant updating of the I/O tables as they change (synchronism).

Periodically, auto-qualification (if enabled) will occur if there is an indication that the 'coherence' between the primary controller 12a and secondary controller 12b has been lost. Coherence indicates that the program 60 in the primary controller 12a and secondary controller 12b are identical, and that the hardware configurations as reflected in the functional module 16 are the same. Events indicating a lack of coherence, detected by either system back-up module 26, will trigger an auto-qualification of the then secondary controller. Such events include start up of the industrial controller, removal or replacement of functional modules 16.

More specifically, two autoqualification flags are stored in the state data 65 of memory 56. The first is user setable and has three possible values: Never Autoqualify, Always Autoqualify, and Conditionally Autoqualify. The second flag (termed the state flag) holds the current state of autoqualification: enabled or disabled. The state flag is set to enabled when the user selects Always Autoqualify and set to disabled when the user selects Never Autoqualify. When the user selects Conditionally Autoqualify, the state is left unchanged but will change when any of the following occur:

TABLE I

| Occurrence | Effect on Flag |
| --- | --- |
| Qualification command received | Enabled |
| Disqualify Secondary command received | Disabled |
| Enter Standby command received | Disabled |
| Swap to Standby Command received | Disabled |

Qualification is performed under the operating systems of the system back-up modules 26 and includes three stages. In a first stage, it is verified through the system back-up modules 26a and 26b, that each functional module 16 in the primary controller 12a has a corresponding module 16 with similar configuration in the secondary controller 12b. In the second stage, the memory 56 of each module 16 of the primary controller 12a is cross-loaded to the memory of the secondary controller 12b. This cross loading includes the user program 60 and the I/O table 62. In the third stage, changes to the configuration flags and programs 60 which have been locked out in stage one are released. After qualification is successfully completed, the system back-up modules 26a and 26b check to see if a switch-over should occur.

The qualified and disqualified modes are determined by whether the controllers have coherence. Generally a qualified secondary controller 12b has had the qualification process completed and is ready to assume control if a switch-over signal is received from the system back-up module 26. Similarly, a disqualified secondary controller 12b has not been qualified or has failed qualification and is not ready to assume control of the controlled process and will refuse such control. In the standby state, the secondary controller 12b has been qualified once and is now locked against further qualification regardless of changes in the primary controller. The purpose of this standby state is to provide a known stable environment that may be returned to when upgrades being tested on the other controller are unsuccessful. A secondary controller 12b in standby mode will assume control even though it is not necessarily coherent as described above with the primary controller 12a.

Figure 4:
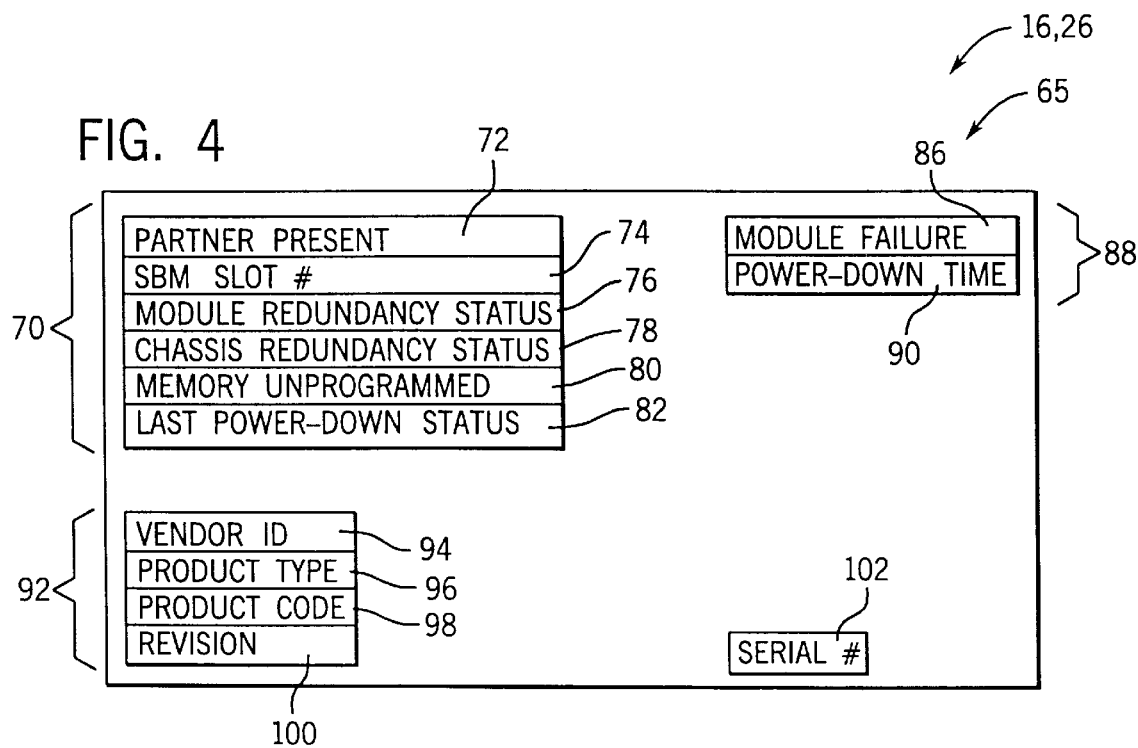
FIG. 4 is a detailed representation of the state flags of FIG. 3 showing data held in each of the controller units indicating its operational status.

Referring now to FIG. 4, the state data 65 of FIG. 3 include a variety of attributes defining the operation of the modules 16. Part of a redundancy object 70, the state data 65 include a first data value 72 indicating whether the particular module 16 in one controller 12 has a corresponding module 16 in the other controller 12 that supports redundancy. No indications are given as to whether the particular module is of the same type, however.

A second data value 74 provides a slot number or physical address of the system back-up module 26. This value is initially set to a high value and is reset to the physical address of the system back-up module 26 for the controller 12 in which that module 16 is resident, as part of the system back-up module's power-up sequence. The modules 16 will reject a value written to this data value 74 that is larger than the current value to ensure that, if there are multiple system back-up modules 26 in a rack, the system back-up module 26 with the lowest physical address will control the system.

A third data value 76 in the redundancy object 70 indicates whether the module 16 is currently operating as a primary or secondary status. Generally, the module has the same status as the controller 12a or 12b as is updated by the system back-up module 26 as will be described. The choices for status are as follows:

TABLE II

| Data Value | Status Meaning |
| --- | --- |
| 1 | Power up/undetermined |
| 2 | Primary with qualified secondary |
| 3 | Primary with disqualified secondary |
| 4 | Primary with no secondary |
| 5 | Primary with standby secondary |
| 6 | Primary with qualifying secondary |
| 7 | Qualifying secondary |
| 8 | Qualified secondary |
| 9 | Disqualified secondary with primary partner |
| 10 | Disqualified secondary with no partner |
| 11 | Standby secondary with compatible partner |
| 12 | Standby secondary without compatible partner |

Similarly, a fourth data value 78 provides the status (as primary and secondary) of the controller 12 as a whole as follows.

TABLE II

| Data Value | Status Meaning |
| --- | --- |
| 1 | Power up/undetermined |
| 2 | Primary with qualified secondary |
| 3 | Primary with disqualified secondary |
| 4 | Primary with no secondary |
| 5 | Primary with standby secondary |
| 6 | Primary with qualifying secondary |
| 7 | Qualifying secondary |
| 8 | Qualified secondary |
| 9 | Disqualified secondary with primary partner |
| 11 | Standby secondary |

Fifth data value 80 indicates whether the memory in a processor module 16, that would normally hold the user program 60, is blank or unprogrammed.

Sixth data value 82 indicates the status of the module 16 when power was last removed, generally as indicated in Table II above. Sixth data value 82 differs from third data value 76 in that for a module just receiving power, the third data value will be undetermined, whereas its last power-down status normally will be determined.

The system back-up module 26 will also have access to data via polling, represented as data value 86 indicating whether any of the modules 16 in the controller 12 of that system back-up module 26 has exerted the system failure line 34. The system back-up object 88 will also include a second data value 90 indicating the time at which the last power-down occurred according to a coordinated clock shared between the modules and the controllers 12.

A device object 92 also exists within each module 16 intended to provide information on the type and characteristics of the module 16. Generally, the device object 92 includes a first data value 94 giving a vendor identification number, a second data value 96 providing a product type number designated by the manufacturer, a third data value 98 being a product code also designated by a manufacturer, and a fourth data value 100 being a revision number typically indicating a change in firmware rather than a change in the hardware of the module.

A serial number 102 is also included in the state data 65 of the system back-up module 26 and for the rack itself.

Each of the above described data values is accessible by the system back-up module 26 of a particular controller 12 and to the system back-up module of the opposing rack by the interchassis data link 28. Thus, the system back-up modules 26 of each controller 12 may read the objects and data of FIG. 4 for all the modules 16 of its own and the other controller 12.

Figure 5:
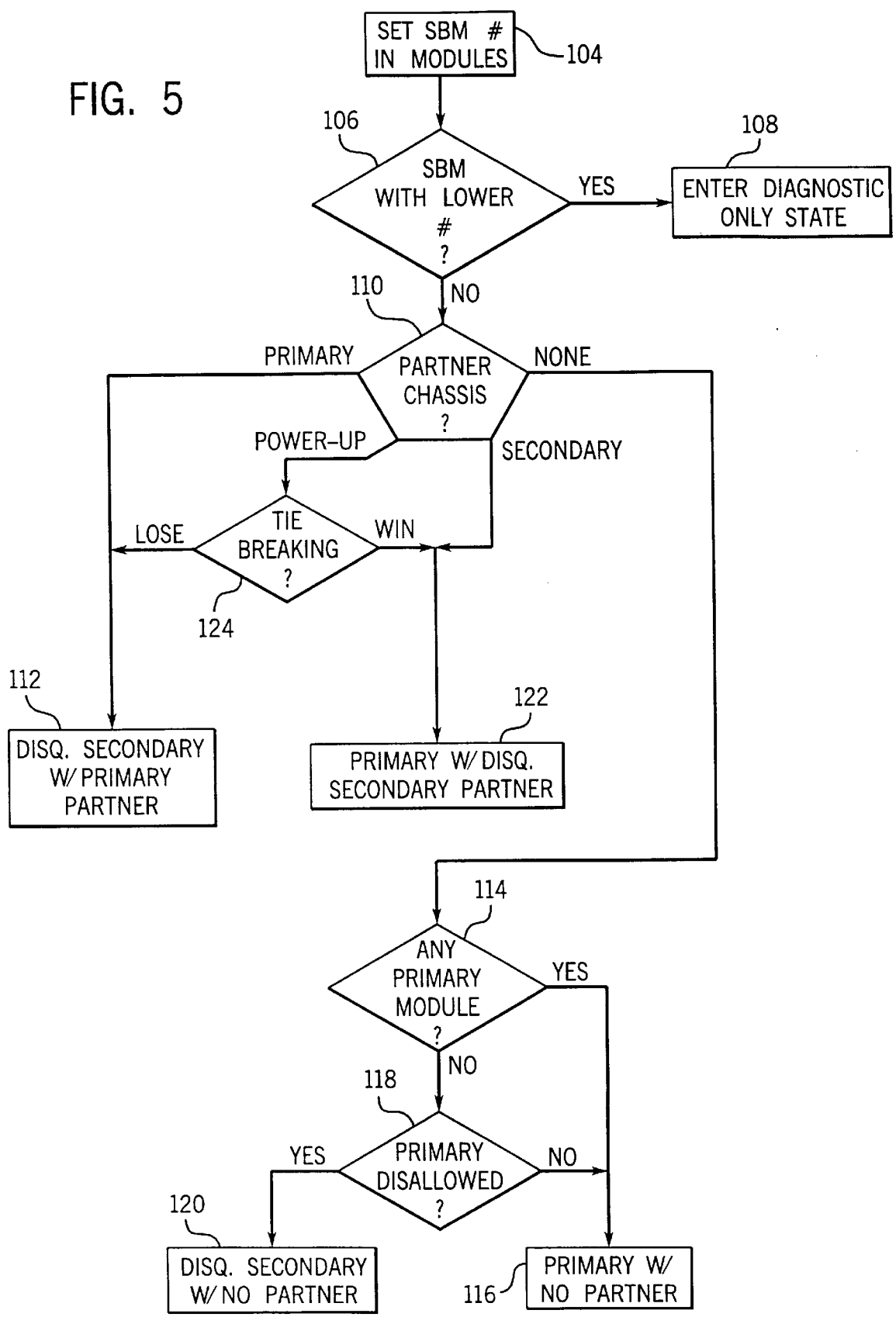
FIG. 5 is a flow chart describing a set of rules to determine which controller becomes primary controller and which controller becomes secondary controller upon a power-up situation.

Referring now to FIG. 5, upon activation the system back-up module 26 executes its operating program 64 to detect a power-up condition of its controller 12a, according to methods well understood in the art. As indicated by process block 104, upon this occurrence, the system back-up module 26 will transmit its physical address to the modules 16 in its own rack for storage in their redundancy objects 70 as data value 74.

Generally, the system back-up module 26 cannot determine whether the power was lost to the entire industrial control system 10 (controllers 12a and 12b), the individual controller 12a in which the system back-up module 26 resides, or simply the system back-up module 26 which may have been added into a running controller 12a to upgrade the controller 12a to include back-up capabilities. This ability to insert the system back-up module 26 into an operating controller 12a creates the risk that a system back-up module is already in the controller 12a. Accordingly, after the system back-up module 26 has written the value to system back-up module slot data value 74, it checks to see if there is another system back-up module in place with a lower address as indicated by refusal of the module 16 to accept the system back-up module slot number. This is indicated by decision block 106. If there is another system back-up module, the system back-up module enters a diagnostic-only state 108 and remains there unless activated by other means or until another power-up occurs.

In the more typical situation, the system back-up module 26 will establish that it is the only system back-up module 26 in the controller 12a and the program will proceed to process block 110 where the system back-up module 26 initiates a query through interchassis data link 28 of the status of the partner controller 12a. This query investigates data value 78 in the back-up module 26 of the partner controller 12b. Generally, the states provided above in Table II will resolve into the partner chassis being a primary, a secondary, or in a power-up state, or nonexistent.

If a partner controller 12b is in a primary state, then it may typically be assumed that only controller 12a experienced a power-down because neither controller 12a nor 12b may assume a primary state after power-up without a tie-breaking procedure to be described. Accordingly, the program then proceeds to process block 112 where the controller unit 12a assumes a state of disqualified secondary state with a primary partner. This state is broadcast to the modules 16 of the controller 12a so that they update their data values 76 and 78 and 82.

The partner controller 12b is then notified of this status and in certain circumstances, a qualification of the secondary 12a may be performed.

Referring again to decision block 110, if there is no partner chassis, then the program proceeds to decision block 114 and it is checked to see if any of the modules 16 in the controller 12a already have a primary state in their data value 76. If so, the program proceeds to process block 116 and the controller 12a becomes a primary with no partner. This status is communicated to the other modules 16 for their redundancy object data values.

If at decision block 114 there are no modules having a primary status, then a primary capability service is executed which checks to see if any of the modules 16 in the present controller 12a have any reason to disallow the chassis from becoming primary (e.g.) if duplicate network addresses are detected there may be another primary. To check whether the system back-up modules 26 or their interconnection 28 have failed, the controller 12 powering-up sends a message to its own address on the network 24 requesting a response. If a response is returned (other than by controller powering-up), it is clear that there is another controller currently operating as the primary. If a duplicate primary is detected, this is considered reason to disallow the chassis from becoming a primary.

If at decision block 118 any of the modules has cause for disallowing the primary, the program proceeds to process block 120 and the controller 12a becomes a disqualified secondary with no partner. Disqualification means it cannot assume control nor can it be qualified until the failure is resolved. Otherwise, if there is no cause for disallowing the primary at decision block 118, the program proceeds again to process block 116.

If at decision block 110, the partner is a secondary status, the program proceeds to process block 122 where the controller 12a becomes a primary with a disqualified secondary partner. This status is communicated to the redundancy object 70 for the modules 16 of that controller 12a.

These situations are relatively straightforward because there is either no redundancy (because there is no partner controller 12b) or there is a clear indication as to which controller 12 should be primary because of the roles they have already assumed. Each of these cases typically involves a situation where the current controller 12a has individually experienced a power-down and the other controller 12b has either continued uninterrupted or was somehow brought on-line substantially before the rack 12a was powered-up again.

A different but important case occurs at decision block 110 where the other controller 12b is in a power-up situation and has not assumed or denied control. This will typically be the state when both controllers 12a and 12b have lost power together and regained power at the same time from a global power failure.

In this case, the program proceeds to decision block 124 to determine which controller 12 will assume primary control and which controller 12 will assume secondary control. In making this determination, the relative speed at which system back-up modules 26 reach decision block 124 is irrelevant, but instead, a set of rules is invoked in each system back-up module 26, independently, that are designed to provide a unique and conflict-free decision as to the allocation of primary and secondary control. As a general matter, the rules are symmetric and do not favor either controller 12a or 12b for primary control. Thus, the user is free to use either controller 12a or controller 12b as its principal primary controller with minimal concern about an arbitrary switching of control in the event of a power failure. Only if the rules fail to select a unique single controller as the primary controller is a system back-up module serial number reverted to break the tie. This rule is not symmetric but always favors the system back-up module with the lower serial number; however, this rule is expected not to be reached nor relied upon for most circumstances. All other rules are applied before this rule.

The rule sequence of decision block 124 reviews the data of the redundancy object 70 and the back-up object 88 and the serial number 102 for each of the controllers 12a and 12b to make the following decisions described in Table III. The rules are performed in order from the top of Table III, downward, until a decision is reached and then no further rules are applied.

TABLE III

Rules of Decision Block 124

| Test | Result | Objective |
| --- | --- | --- |
| If one and only one controller has modules which are already in the primary state. | Controller with a module already in the primary state becomes primary. | Retain primary controller as such if system back-up modules are simultaneously inserted in each system |
| If one and only one controller has one or more failed modules. | Chassis without any failed modules becomes primary. | Give control to controller with no failed modules. |
| If one and only one controller has modules which were in a disqualified secondary at last power-down. | Chassis without disqualified modules becomes primary. | Give control to controller that is more likely to have valid user programs and I/O data tables. |
| If one and only one controller has processor module with default/blank memories. | Chassis without blank memory in processor module becomes primary. | Give control to controller that is more likely to have been programmed. |
| If one and only one controller has a System Backup Module that was in a standby secondary state at last power-down. | Chassis with the System Backup Module that was not in a standby secondary state becomes primary. | Give control to previous primary of a primary/standby secondary pair. |
| The System Backup Module in one controller has a more recent (later) power-down time than the System Backup Module in the other controller. (Time differences of less than one second will be considered equal.) | Controller containing the System Backup Module with the most recent (later) power-down time becomes primary if it has no failed modules. | Give control to the controller that was last in control. |
| If modules that are resident in one controller is a smaller subset of the modules that are resident in the other controller and the modules in the subset all occupy identical slot locations to their corresponding partners. | Controller with more modules becomes primary if it has no failed modules. | Give control to the controller that has more modules. |
| Compare controller serial numbers. | Controller with the lowest serial number without failed modules becomes primary. | The final tie-breaking step, based upon a number that is unique to each controller manufactured. |

Per FIG. 5, the controller 12a is considered to win if the rules of Table III indicate that it will become the primary controller, in which case the program branches to process block 122 previously described. If the controller 12a loses, and is not made the primary controller, the program branches to process block 112 also previously described.

As will be understood from the above rules, the rules endeavor to deduce the best controller 12 to assume primary control under the present and previous circumstances based on evidence remaining in the module's memories. Only with the last rule is the serial number or a mechanical approach adopted, such as would tend to favor one particular controller regardless of the controller which was actually operating as a primary controller. Nevertheless, this last rule will be reached only if none of the other rules provide a unique determination of the primary controller and in such cases, it is unlikely that one rack would be favored.

The above description has been that of a preferred embodiment of the present invention. It will occur to those that practice the art that many modifications may be made without departing from the spirit and scope of the invention. For example, in a computing system where components communicate freely with each other, particular hardware or operating programs may be distributed among different components and hence, for example, the back-up functions of the back-up module need not be performed in a particular unit but may be spread out among units. In order to apprise the public of the various embodiments that may fall within the scope of the invention, the following claims are made.

We claim:

1. An industrial control system having a first and second controller unit, the two controller units operable in a primary/secondary control relationship with a primary controller unit providing active control of an industrial process and a secondary controller unit providing back-up for the primary controller unit, the controller units each comprising:
a communication link to another of the controller units;
a state memory having data indicating the operation of the controller unit including whether the controller unit was operating as a primary or secondary controller unit during a time prior to a power-up of the controller unit;
a processor executing a stored program to:
(i) detect a power-up of the controller unit;
(ii) upon the power-up query a state memory of the other controller unit and the state memory of the controller unit; and
(iii) subsequent to the query when the state memory of the other controller unit indicates the other controller unit is present but operating neither as a primary controller unit nor a secondary controller unit, preventing the controller unit from operating as a primary controller unit unless such operation is indicated by execution of a predetermined set of rules operating on data from the state memories available to both the controller units, the rules uniquely indicating which of the controller units is likely to be most suitable to serve a primary controller;

whereby the determination as to which controller unit becomes primary controller unit is not a race condition.

2. The industrial control system of claim 1 wherein the controller units are composed of functional modules including a processor module having a program memory holding a control program; and wherein the data of the state memory is selected from the group consisting of data indicating:

whether one or more modules have failed; whether one or more modules were previously operating as part of a primary controller; whether one or more modules were previously operating as part of a secondary controller; whether the program memory is blank; the time of a previous power-down of the controller unit; the number and type of functional modules; whether one or more modules detects duplicate network addresses and a unique controller unit serial number.

3. The controller unit of claim 1 wherein the controller units are comprised of interconnected functional modules, and wherein the data operated on by the rules is data indicating whether any of the functional modules of the controller units are presently part of a primary controller; and wherein the rule is to enable a controller unit as the primary controller unit when only that controller unit has functional modules with values indicating their present operation is as part of a primary controller.

4. The controller unit of claim 1 wherein the controller units are comprised of interconnected functional modules; and wherein the data operated on by the rules is data indicating whether a functional module has failed; and wherein the rule enables an industrial controller as the primary controller unit when only that controller unit has functional modules without failures.

5. The controller unit of claim 1 wherein the controller units are comprised of interconnected functional modules; and wherein the data operated on by the rules is data indicating whether any of the functional modules of the controller units were most recently part of a secondary controller; and wherein the rule is to enable a controller unit as the primary controller unit when only that controller unit does not have functional modules with most recent operation as part of a secondary controller.

6. The controller unit of claim 1 wherein the controller units are comprised of interconnected functional modules and the functional modules include flags having values indicating a programming memory of the functional module is blank, and wherein the data operated on by the rules is the values, and wherein the rule is to enable a controller unit as the primary controller unit when only that controller unit has no functional modules with a value indicating their programming memories are blank.

7. The controller unit of claim 1 wherein the controller units are comprised of interconnected finctional modules; and wherein the data operated on by the rules is the time of a previous power-down of the respective controller unit; and wherein the rule is to enable a controller unit as the primary controller unit when the time of a previous power-down is the more recent than the time of a previous power-down for the other controller unit.

8. The controller unit of claim 7 wherein the rule disregards fractions of seconds in a comparison of the times.

9. The controller unit of claim 1 wherein the controller units are comprised of interconnected functional modules; and wherein the data operated on by the rules is data indicating the number of modules; and wherein the rule is to enable a controller unit as the primary controller unit when that controller unit has more functional modules.

10. The controller unit of claim 1 wherein the first and second controller unit have the same address on the communication link; and wherein the processor executes the stored program to, when an attempted reading of the state memory of the other controller unit indicates the other controller unit is not present; send a message on the communications link to the address and operating as a primary controller unit unless the message is answered.

* * * * *